US012387639B2

(12) United States Patent
Hwang et al.

(10) Patent No.: US 12,387,639 B2
(45) Date of Patent: Aug. 12, 2025

(54) DISPLAY DEVICE, METHOD FOR DRIVING THE SAME, AND HEAD-MOUNTED DISPLAY APPARATUS

(71) Applicants: Samsung Display Co., LTD., Yongin-si (KR); UIF (University Industry Foundation), Yonsei University, Seoul (KR)

(72) Inventors: Hyungsuk Hwang, Yongin-si (KR); Youra Kim, Yongin-si (KR); Hyosun Kim, Yongin-si (KR); Cheong Il Kim, Seoul (KR); Jeong Hyeon Park, Seoul (KR); Sang Chul Chong, Seoul (KR); Ji Eun Cho, Seoul (KR); Jeung Hwan Choi, Seoul (KR)

(73) Assignees: Samsung Display Co., Ltd., Yongin-si (KR); UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/633,449

(22) Filed: Apr. 11, 2024

(65) Prior Publication Data

US 2025/0037622 A1 Jan. 30, 2025

(30) Foreign Application Priority Data

Jul. 26, 2023 (KR) ........................ 10-2023-0097314

(51) Int. Cl.
*G09G 3/00* (2006.01)
*G09G 3/20* (2006.01)

(52) U.S. Cl.
CPC ........... *G09G 3/002* (2013.01); *G09G 3/2003* (2013.01); *G09G 2320/0233* (2013.01);
(Continued)

(58) Field of Classification Search
CPC ................................ G09G 3/00; G09G 3/002
See application file for complete search history.

(56) References Cited

U.S. PATENT DOCUMENTS 10,330,935 B2 6/2019 Shpunt
10,401,952 B2 9/2019 Young et al.
(Continued)

OTHER PUBLICATIONS

Krajancich et al. A Perceptual Model for Eccentricity-dependent Spatio-temporal Flicker Fusion and its Applications to Foveated Graphics; https://www.computationalimaging.org/publications/cff/; Jun. 20, 2021; 11 pages.
(Continued)

*Primary Examiner* — Roy P Rabindranath
(74) *Attorney, Agent, or Firm* — Womble Bond Dickinson (US) LLP

(57) ABSTRACT

A display device includes a driving frequency calculator configured to divide output image data into central, intermediate, and peripheral images respectively corresponding to central, intermediate, and peripheral visual field regions, calculate spatial frequencies of the central image, the intermediate image, and the peripheral image, calculate critical flicker frequencies of the central visual field region, the intermediate visual field region, and the peripheral visual field region based on the spatial frequencies and based on viewing angles of the central visual field region, the intermediate visual field region, and the peripheral visual field region, and determine driving frequencies of the central visual field region, the intermediate visual field region, and the peripheral visual field region based on the critical flicker frequencies, and a display panel configured to display an image based on the output image data and based on the driving frequencies.

20 Claims, 11 Drawing Sheets

(52) U.S. Cl.
CPC ............... *G09G 2320/0247* (2013.01); *G09G 2320/028* (2013.01); *G09G 2320/0686* (2013.01); *G09G 2330/021* (2013.01); *G09G 2340/0407* (2013.01); *G09G 2354/00* (2013.01)

(56) References Cited

U.S. PATENT DOCUMENTS

| | | | | |
|---|---|---|---|---|
| 2019/0289191 | A1* | 9/2019 | Noda | H04N 23/73 |
| 2022/0139324 | A1* | 5/2022 | Jeong | G09G 3/3266<br>345/204 |
| 2022/0351660 | A1* | 11/2022 | Kim | G09G 3/20 |
| 2023/0034010 | A1* | 2/2023 | Ishikawa | B41J 2/3556 |

OTHER PUBLICATIONS

Mantiuk et al. stelaCSF—A Unified Model of Contrast Sensitivity as the Function of Spatio-Temporal Frequency, Eccentricity, Luminance and Area; ACM Trans. Graph., vol. 41, No. 4, Article 145. Publication date: Jul. 2022; 16 pages.

* cited by examiner

DISPLAY DEVICE, METHOD FOR DRIVING THE SAME, AND HEAD-MOUNTED DISPLAY APPARATUS

CROSS-REFERENCE TO RELATED APPLICATION

The present application claims priority to, and the benefit of, Korean Patent Application No. 10-2023-0097314, filed on Jul. 26, 2023, in the Korean Intellectual Property Office, the entire disclosure of which is incorporated herein by reference.

BACKGROUND

1. Field

Embodiments relate to an electronic apparatus, to a display device, to a method for driving the display device, and to a head-mounted display apparatus including the display device.

2. Description of the Related Art

A head-mounted display (HMD) apparatus refers to an electronic apparatus that is worn on a head of a user like glasses to allow the user to receive visual information through the electronic apparatus. According to the trend toward lighter and smaller electronic apparatuses, various wearable electronic apparatuses are being developed, and head-mounted display apparatuses are also being widely used.

Because the head-mounted display apparatus is mounted on the head of the user, the head-mounted display apparatus may operate close to eyes of the user. Recently, various methods capable of improving quality of an image provided through the head-mounted display apparatus and reducing power consumption of the head-mounted display apparatus are being studied.

SUMMARY

Embodiments provide a display device with improved image quality and reduced power consumption.

Embodiments provide a method for driving a display device with improved image quality and reduced power consumption.

Embodiments provide a head-mounted display apparatus with improved image quality and reduced power consumption.

A display device according to embodiments may include a driving frequency calculator configured to divide output image data into a central image, an intermediate image, and a peripheral image respectively corresponding to a central visual field region, an intermediate visual field region, and a peripheral visual field region, calculate spatial frequencies of the central image, the intermediate image, and the peripheral image, calculate critical flicker frequencies of the central visual field region, the intermediate visual field region, and the peripheral visual field region based on the spatial frequencies and based on viewing angles of the central visual field region, the intermediate visual field region, and the peripheral visual field region, and determine driving frequencies of the central visual field region, the intermediate visual field region, and the peripheral visual field region based on the critical flicker frequencies, and a display panel configured to display an image based on the output image data and based on the driving frequencies.

The output image data may include input image data on which foveated rendering is performed.

The display device may further include a visual field tester configured to measure the central visual field region, the intermediate visual field region, and the peripheral visual field region through a visual field test.

The visual field tester may be configured to set a region including a gaze point as the central visual field region, set a region surrounding the central visual field region as the intermediate visual field region, and set a region excluding the central visual field region and the intermediate visual field region, among an entire visual field region, as the peripheral visual field region.

The spatial frequencies may be calculated by performing fast Fourier transform (FFT) on the central image, the intermediate image, and the peripheral image.

A spatial frequency of the peripheral image may be less than a spatial frequency of the central image.

The critical flicker frequencies may be calculated by using a temporal contrast sensitivity function.

The driving frequencies of the central visual field region, the intermediate visual field region, and the peripheral visual field region may be greater than or equal to the critical flicker frequencies of the central visual field region, the intermediate visual field region, and the peripheral visual field region, respectively.

The display device may further include a renderer configured to convert input image data into the output image data by performing foveated rendering on the input image data.

A method for driving a display device according to embodiments may include dividing output image data into a central image, an intermediate image, and a peripheral image respectively corresponding to a central visual field region, an intermediate visual field region, and a peripheral visual field region, calculating spatial frequencies of the central image, the intermediate image, and the peripheral image, calculating critical flicker frequencies of the central visual field region, the intermediate visual field region, and the peripheral visual field region based on the spatial frequencies and based on viewing angles of the central visual field region, the intermediate visual field region, and the peripheral visual field region, determining driving frequencies of the central visual field region, the intermediate visual field region, and the peripheral visual field region based on the critical flicker frequencies, and displaying an image based on the output image data and based on the driving frequencies.

The method may further include generating the output image data by performing foveated rendering on input image data.

The method may further include measuring the central visual field region, the intermediate visual field region, and the peripheral visual field region through a visual field test.

The method may further include setting a region including a gaze point as the central visual field region, setting a region surrounding the central visual field region as the intermediate visual field region, and setting a region excluding the central visual field region and the intermediate visual field region, among an entire visual field region, as the peripheral visual field region.

The spatial frequencies may be calculated by performing fast Fourier transform (FFT) on the central image, the intermediate image, and the peripheral image.

A spatial frequency of the peripheral image may be less than a spatial frequency of the central image.

The critical flicker frequencies may be calculated by using a temporal contrast sensitivity function.

The driving frequencies of the central visual field region, the intermediate visual field region, and the peripheral visual field region may be greater than or equal to the critical flicker frequencies of the central visual field region, the intermediate visual field region, and the peripheral visual field region, respectively.

The method may further include converting input image data into the output image data by performing foveated rendering on the input image data.

A head-mounted display apparatus according to embodiments may include a processor configured to convert input image data into output image data, and a display device configured to display an image based on the output image data, and including a driving frequency calculator configured to divide the output image data into a central image, an intermediate image, and a peripheral image respectively corresponding to a central visual field region, an intermediate visual field region, and a peripheral visual field region, calculate spatial frequencies of the central image, the intermediate image, and the peripheral image, calculate critical flicker frequencies of the central visual field region, the intermediate visual field region, and the peripheral visual field region based on the spatial frequencies and based on viewing angles of the central visual field region, the intermediate visual field region, and the peripheral visual field region, and determine driving frequencies of the central visual field region, the intermediate visual field region, and the peripheral visual field region based on the critical flicker frequencies, and a display panel configured to display the image based on the output image data and based on the driving frequencies.

The processor may be configured to generate the output image data by performing foveated rendering on the input image data.

In the display device, the method for driving the display device, and the head-mounted display apparatus according to one or more embodiments, the critical flicker frequencies in the central visual field region, the intermediate visual field region, and the peripheral visual field region may be calculated based on the spatial frequencies in the central image, the intermediate image, and the peripheral image. Further, the driving frequencies in the central visual field region, the intermediate visual field region, and the peripheral visual field region may be determined based on the critical flicker frequencies, so that a user may not visually recognize a flicker, and image quality of the display device and the head-mounted display apparatus may be improved. Further, the driving frequencies may be controlled for each visual field region, so that power consumption of the display device and the head-mounted display apparatus may be reduced.

BRIEF DESCRIPTION OF DRAWINGS

Illustrative, non-limiting embodiments will be more clearly understood from the following detailed description taken in conjunction with the accompanying drawings.

DETAILED DESCRIPTION

Figure 1:
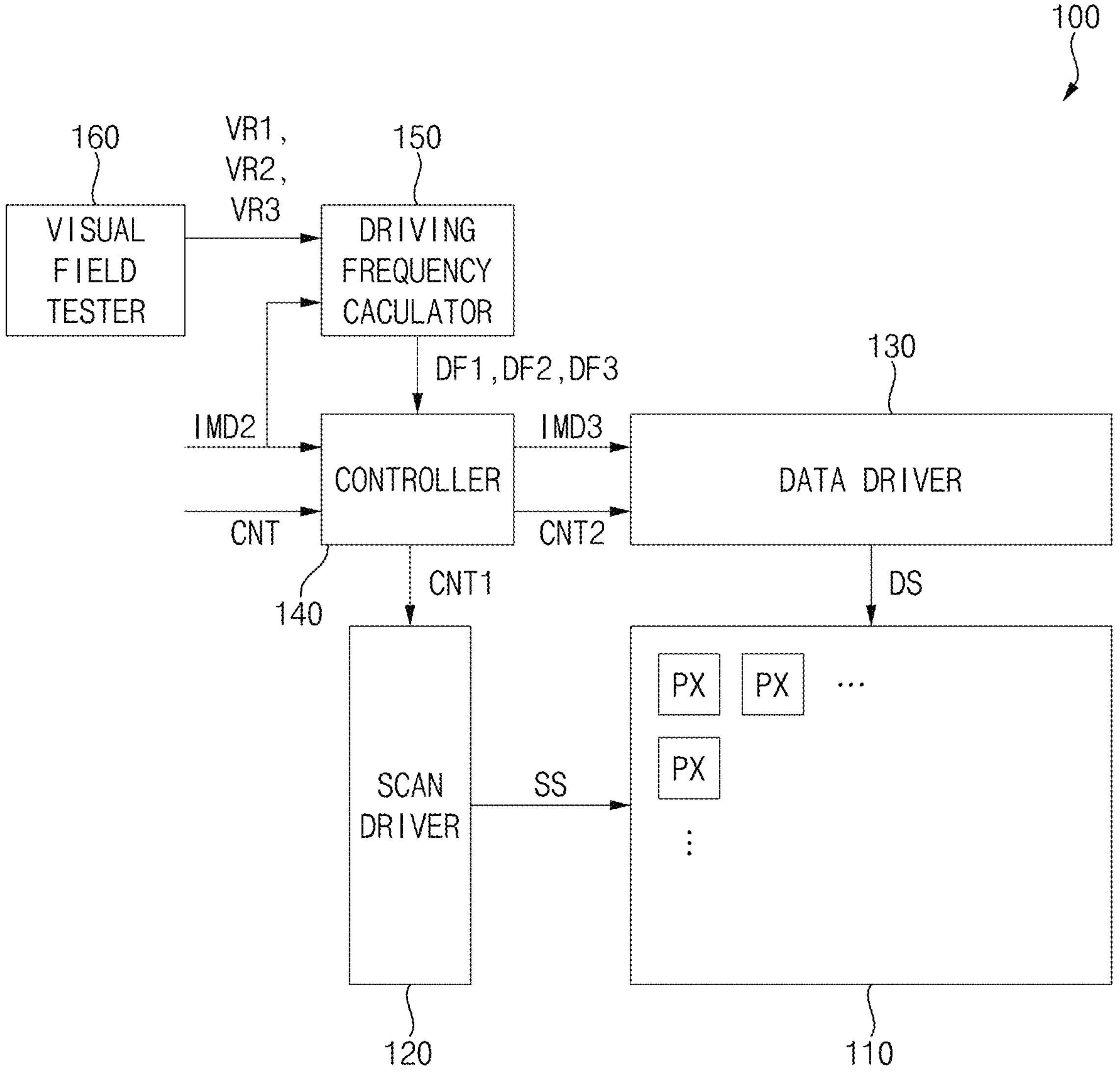
FIG. 1 is a block diagram showing a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions “at least one of A and B” and “at least one of A or B” may include A, B, or A and B. As used herein, “or” generally means “and/or,” and the term “and/or” includes any and all combinations of one or more of the associated listed items. For example, the expression “A and/or B” may include A, B, or A and B. Similarly, expressions such as “at least one of,” “a plurality of,” “one of,” and other prepositional phrases, when preceding a list of elements, modify the entire list of elements and do not modify the individual elements of the list.

It will be understood that, although the terms “first,” “second,” “third,” etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a “first” element may not require or imply the presence of a second element or other elements. The terms “first,” “second,” etc. may also be used herein to differentiate different categories or sets of elements. For conciseness, the terms “first,” “second,” etc. may represent “first-category (or first-set),” “second-category (or second-set),” etc., respectively.

The terminology used herein is for the purpose of describing embodiments only and is not intended to be limiting of the present disclosure. As used herein, the singular forms “a” and “an” are intended to include the plural forms as well, while the plural forms are also intended to include the singular forms, unless the context clearly indicates otherwise. It will be further understood that the terms “comprises,” “comprising,” “have,” “having,” “includes,” and “including,” when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term “substantially,” “about,” “approximately,” and similar terms are used as terms of approximation and not as terms of degree, and are intended to account for the inherent deviations in measured or calculated values that would be recognized by those of ordinary skill in the art. For example, “substantially” may include a range of +/−5% of a corresponding value. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value. Further, the use of “may” when describing embodiments of the present disclosure refers to “one or more embodiments of the present disclosure.”

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
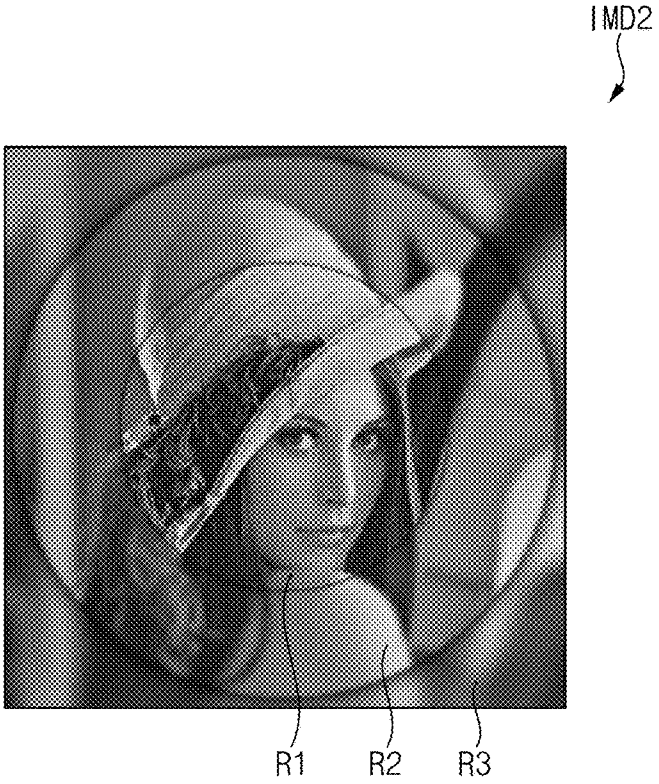
FIG. 2 is a view for describing output image data provided to a driving frequency calculator included in the display device of FIG. 1.
Figure 3:
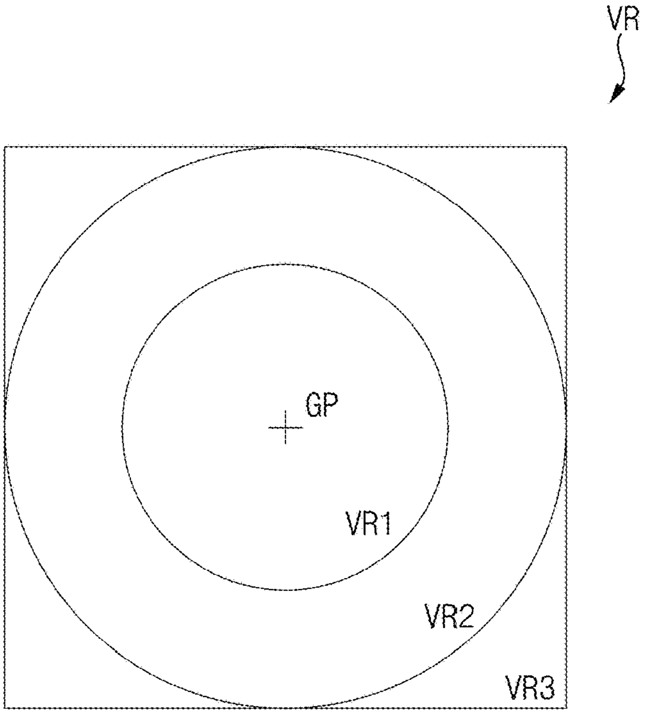
FIG. 3 is a view for describing a visual field tester included in the display device of FIG. 1.
Figure 4:
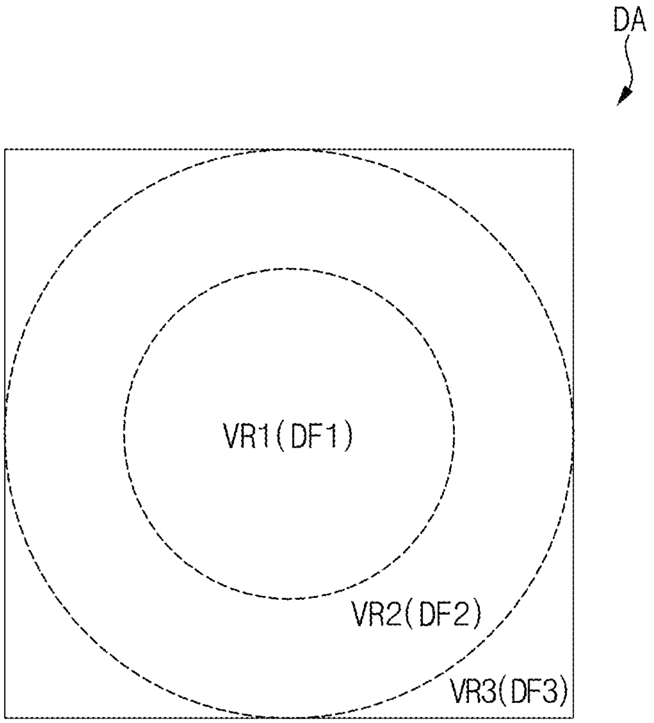
FIG. 4 is a view for describing an operation of a controller included in the display device of FIG. 1.

FIG. 1 is a block diagram showing a display device 100 according to one or more embodiments of the present disclosure. FIG. 2 is a view for describing output image data IMD2 provided to a driving frequency calculator 150 included in the display device 100 of FIG. 1. FIG. 3 is a view for describing a visual field tester 160 included in the display device 100 of FIG. 1. FIG. 4 is a view for describing an operation of a controller 140 included in the display device 100 of FIG. 1.

Referring to FIG. 1, a display device 100 may include a display panel 110, a scan driver 120, a data driver 130, a controller 140, a driving frequency calculator 150, and a visual field tester 160.

The display panel 110 may include pixels PX. According to one or more embodiments, the pixels PX may include a first pixel configured to emit a light having a first color, a second pixel configured to emit a light having a second color, and a third pixel configured to emit a light having a third color. For example, the first color, the second color, and the third color may be red, green, and blue, respectively.

The scan driver 120 may provide scan signals SS to the pixels PX. The scan driver 120 may sequentially generate first to $n^{th}$ scan signals SS (where n is a natural number greater than or equal to 2) respectively corresponding to first to $n^{th}$ pixel rows, and based on a first control signal CNT1. The first control signal CNT1 may include a scan clock signal, a scan start signal, and/or the like.

The data driver 130 may provide data signals DS to the pixels PX. The data driver 130 may generate first to $m^{th}$ data signals DS (where m is a natural number greater than or equal to 2) respectively corresponding to the first to $m^{th}$ pixel columns, and based on correction image data IMD3 and a second control signal CNT2. According to one or more embodiments, the correction image data IMD3 may include gray level values corresponding to the pixels PX, respectively. The second control signal CNT2 may include a data clock signal, a horizontal start signal, a load signal, and/or the like.

The controller 140 may control an operation (or driving) of the scan driver 120 and an operation (or driving) of the data driver 130. The controller 140 may generate the first control signal CNT1, the second control signal CNT2, and the correction image data IMD3 based on output image data IMD2, based on a control signal CNT, and based on first to third driving frequencies DF1, DF2, and DF3. According to one or more embodiments, the output image data IMD2 may include gray level values corresponding to the pixels PX, respectively. The controller 140 may convert the output image data IMD2 into the correction image data IMD3. The control signal CNT may include a master clock signal, a vertical synchronization signal, a horizontal synchronization signal, a data enable signal, and/or the like. The first driving frequency DF1 may be a driving frequency of a central visual field region VR1, the second driving frequency DF2 may be a driving frequency of an intermediate visual field region VR2, and the third driving frequency DF3 may be a driving frequency of a peripheral visual field region VR3.

The driving frequency calculator 150 may divide output image data IMD2, which is externally received, into a central image, an intermediate image, and a peripheral image respectively corresponding to a central visual field region VR1, an intermediate visual field region VR2, and a peripheral visual field region VR3 of a user. The driving frequency calculator 150 may also calculate spatial frequencies of the central image, the intermediate image, and the peripheral image. The driving frequency calculator 150 may also calculate critical flicker frequencies of the central visual field region VR1, the intermediate visual field region VR2, and the peripheral visual field region VR3 based on the spatial frequencies and viewing angles of the central visual field region VR1, the intermediate visual field region VR2, and the peripheral visual field region VR3. Further, the driving frequency calculator 150 may determine driving frequencies DF1, DF2, and DF3 of the central visual field region VR1, the intermediate visual field region VR2, and the peripheral visual field region VR3 based on the critical flicker frequencies. The first driving frequency DF1 may be a driving frequency at which a flicker is not visually recognized in the central visual field region VR1, the second driving frequency DF2 may be a driving frequency at which a flicker is not visually recognized in the intermediate visual field region VR2, and the third driving frequency DF3 may be a driving frequency at which a flicker is not visually recognized in the peripheral visual field region VR3.

According to one or more embodiments, the output image data IMD2 may be generated by performing foveated rendering on input image data. In other words, the input image data may be converted into the output image data IMD2 by performing the foveated rendering on the input image data. The foveated rendering may be a technology for reducing a resolution of a region other than a region at which the user gazes (e.g., directly gazes), so that a size of image data may be reduced when the foveated rendering is used.

According to one or more embodiments, as shown in FIG. 2, the output image data IMD2 may include a foveal region R1, a blend region R2, and a peripheral region R3. The foveal region R1 may be a region at which the user gazes (e.g., directly gazes), the blend region R2 may be located outside the foveal region R1, and the peripheral region R3 may be located outside the blend region R2. The foveal region R1 may have a high resolution, the blend region R2 may have a medium resolution, and the peripheral region R3 may have a low resolution. Through the foveated rendering, the resolution of the blend region R2 may be lower than the resolution of the foveal region R1, and the resolution of the peripheral region R3 may be lower than the resolution of the blend region R2.

The visual field tester 160 may measure the central visual field region VR1, the intermediate visual field region VR2, and the peripheral visual field region VR3 through a visual field test for the user. As shown in FIG. 3, the visual field tester 160 may set a region including a gaze point GP of the user as the central visual field region VR1, may set a region surrounding the central visual field region VR1 as the intermediate visual field region VR2, and may set a region excluding the central visual field region VR1 and the intermediate visual field region VR2 (e.g., among an entire visual field region VR of the user) as the peripheral visual field region VR3.

According to one or more embodiments, the visual field tester 160 may perform a visual field test for left and right eyes of the user by using a dynamic visual field measurement scheme, and may measure the central visual field region VR1, the intermediate visual field region VR2, and the peripheral visual field region VR3 for each of the left and right eyes of the user through a result of the visual field test. The visual field tester 160 may store the central visual field region VR1, the intermediate visual field region VR2, and the peripheral visual field region VR3 of the user in a storage unit such as a memory.

According to one or more embodiments, the driving frequency calculator 150 may receive the central visual field region VR1, the intermediate visual field region VR2, and the peripheral visual field region VR3 generated through the visual field test from the outside. In this case, the visual field tester 160 may be omitted.

The controller 140 may control the operation of the scan driver 120 and the operation of the data driver 130 based on the output image data IMD2 and based on the first to third driving frequencies DF1, DF2, and DF3. Also, as shown in FIG. 4, in a display region DA of the display panel 110, the central visual field region VR1 may be driven at the first driving frequency DF1, the intermediate visual field region VR2 may be driven at the second driving frequency DF2, and the peripheral visual field region VR3 may be driven at the third driving frequency DF3. Accordingly, a flicker may not be visually recognized in an image displayed by the display device 100, and image quality of the display device 100 may be improved. In addition, because the central visual field region VR1, the intermediate visual field region VR2, and the peripheral visual field region VR3 are respectively driven at the driving frequencies DF1, DF2, and DF3 that are independent of each other, power consumption of the display device 100 may be reduced.

Figure 5:
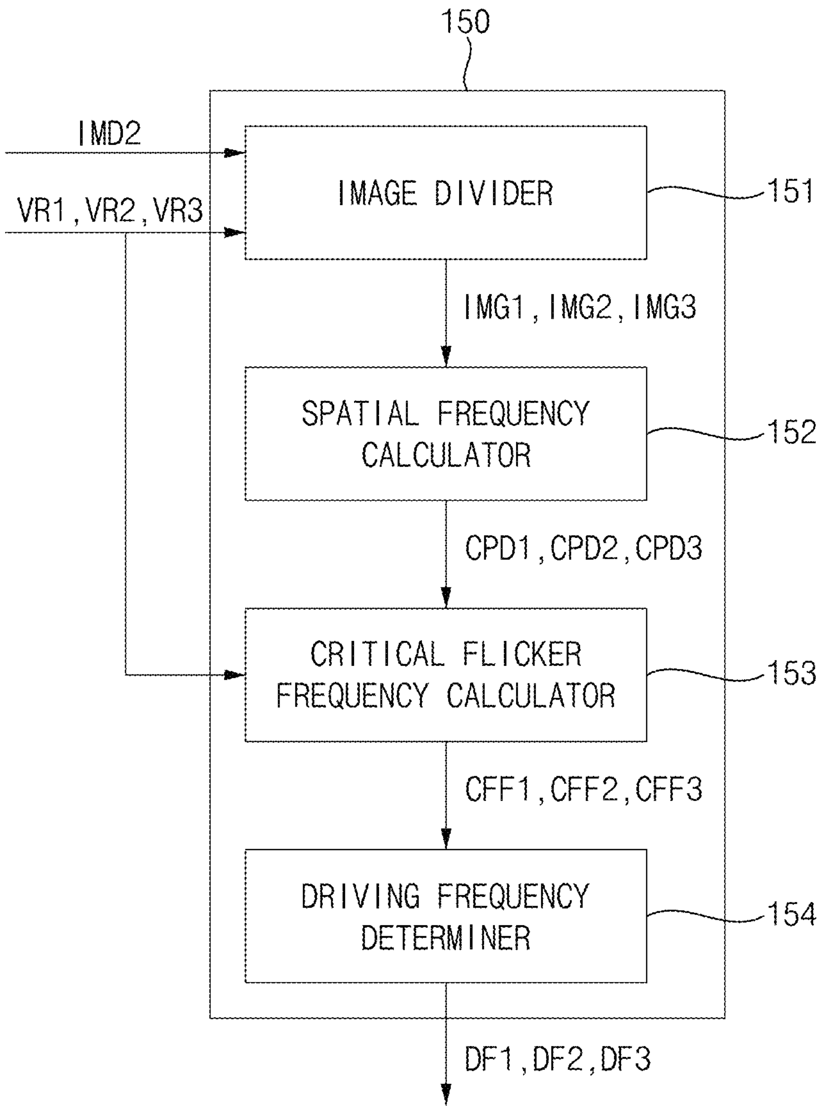
FIG. 5 is a block diagram showing the driving frequency calculator included in the display device of FIG. 1.
Figure 6:
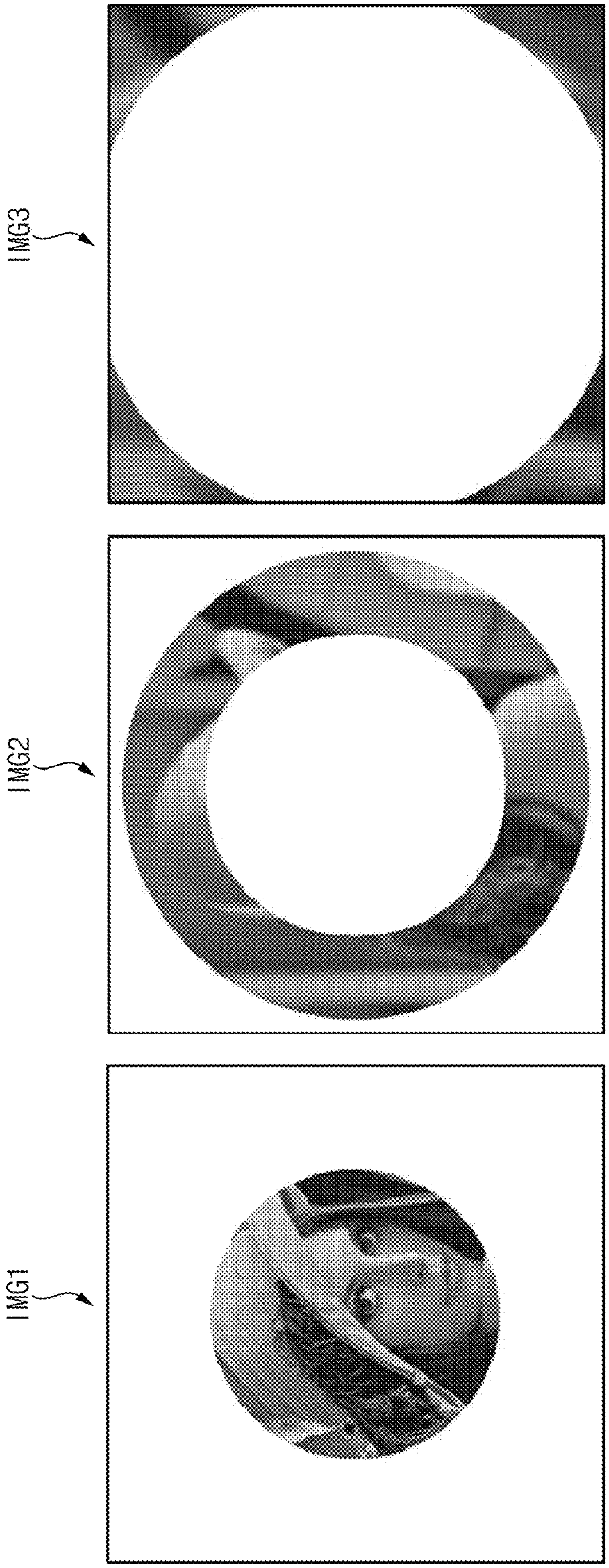
FIG. 6 is a view for describing an image divider included in the driving frequency calculator of FIG. 5.
Figure 7:
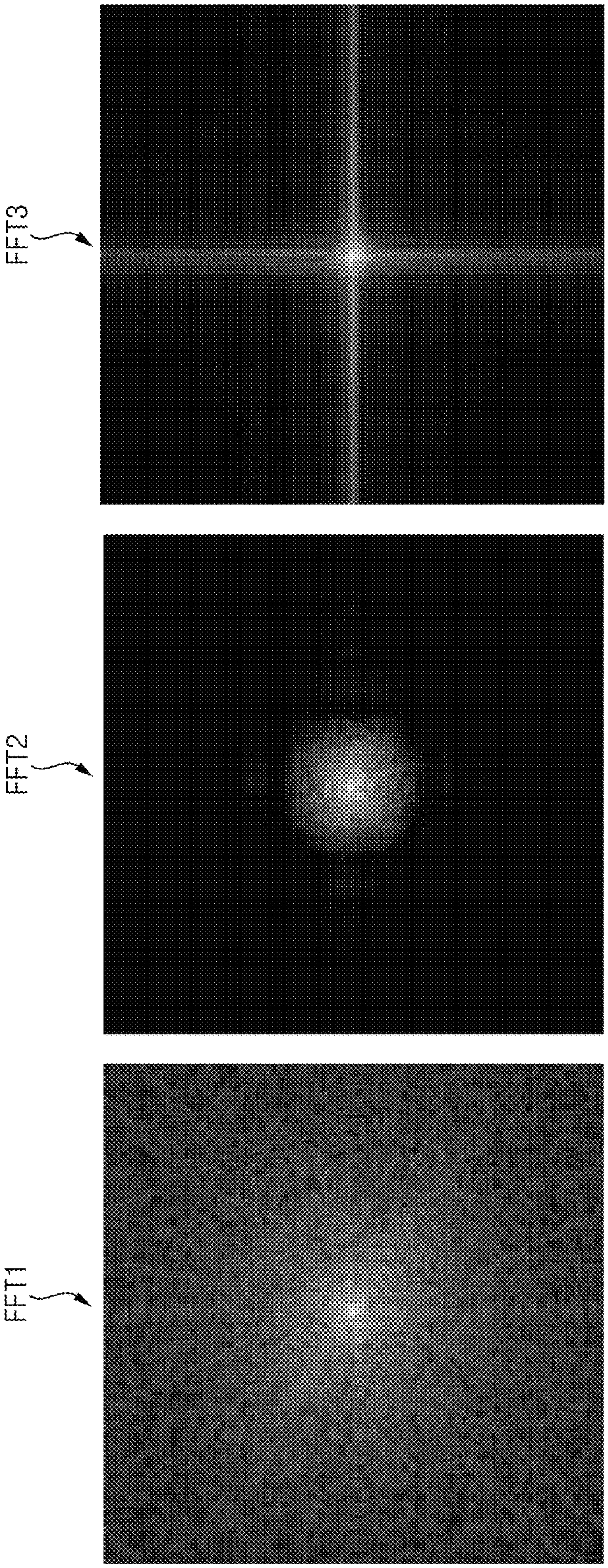
FIG. 7 is a view for describing a spatial frequency calculator included in the driving frequency calculator of FIG. 5.
Figure 8:
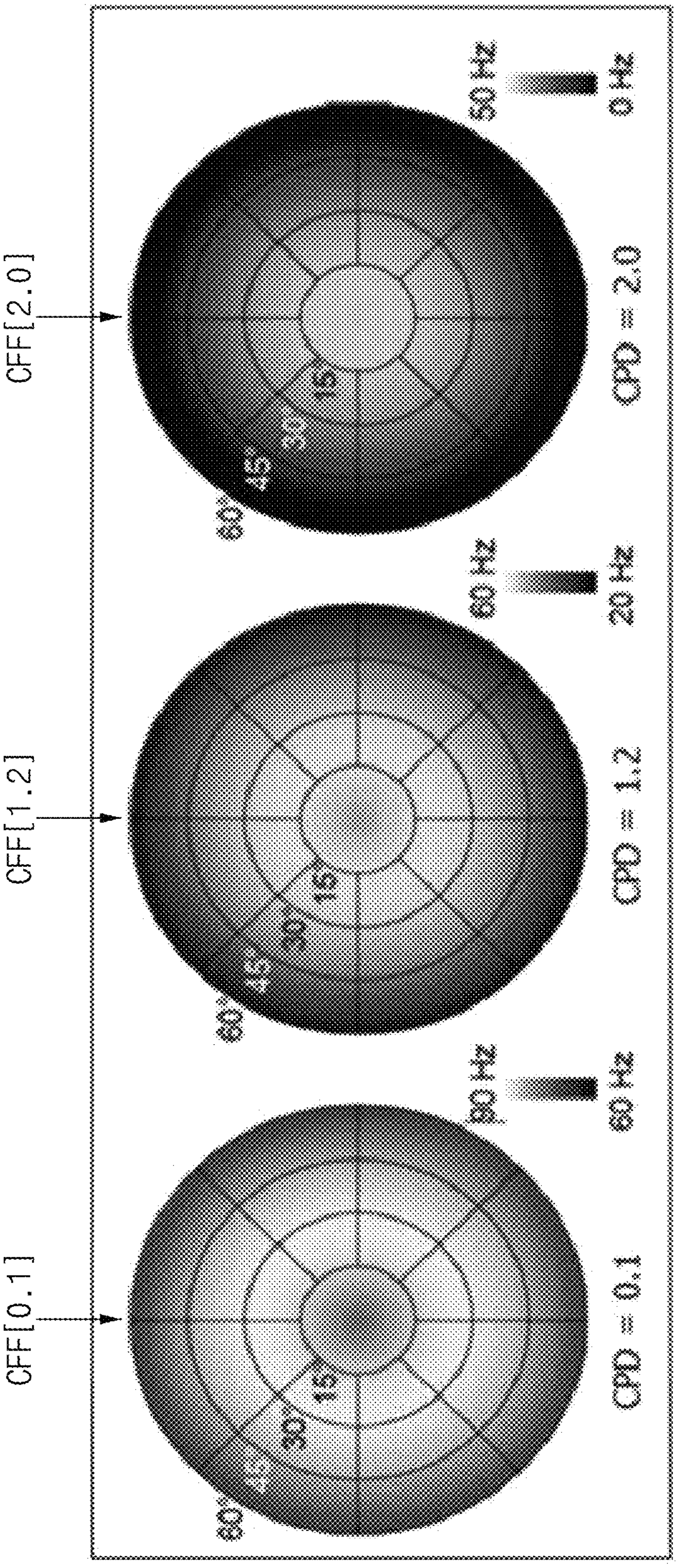
FIGS. 8 and 9 are views for describing a critical flicker frequency calculator included in the driving frequency calculator of FIG. 5.
Figure 9:
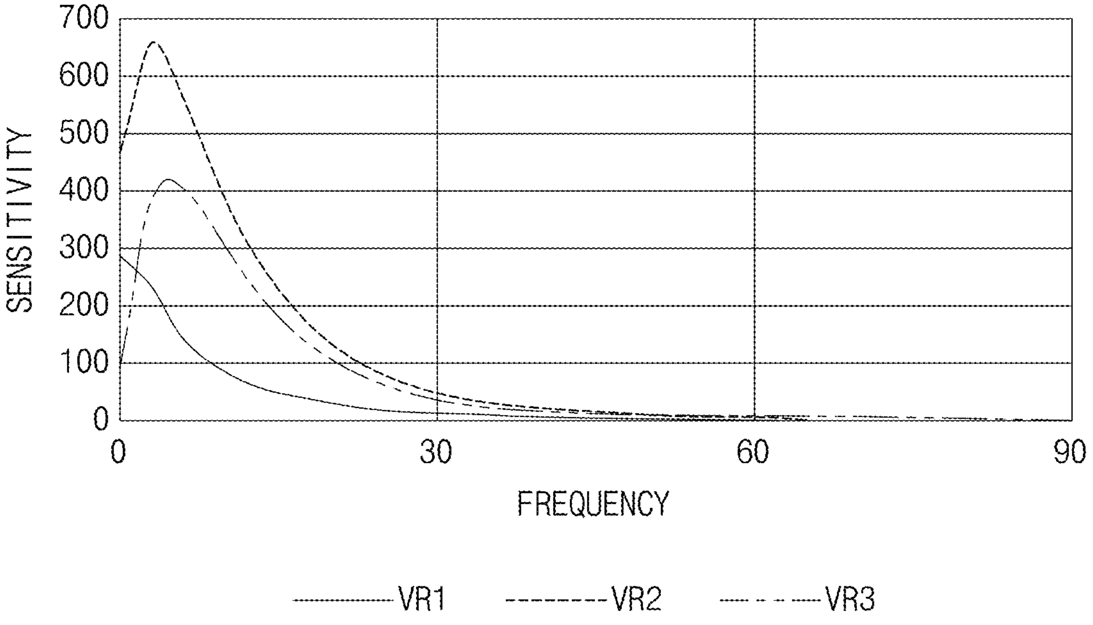

FIG. 5 is a block diagram showing the driving frequency calculator 150 included in the display device 100 of FIG. 1. FIG. 6 is a view for describing an image divider 151 of the driving frequency calculator 150 of FIG. 5. FIG. 7 is a view for describing a spatial frequency calculator 152 of the driving frequency calculator 150 of FIG. 5. FIGS. 8 and 9 are views for describing a critical flicker frequency calculator 153 of the driving frequency calculator 150 of FIG. 5.

Referring to FIG. 5, the driving frequency calculator 150 may include an image divider 151, a spatial frequency calculator 152, a critical flicker frequency calculator 153, and a driving frequency determiner 154.

The image divider 151 may divide the output image data IMD2 into a central image IMG1, an intermediate image IMG2, and a peripheral image IMG3. As shown in FIG. 6, the central image IMG1, the intermediate image IMG2, and the peripheral image IMG3 may correspond to the central visual field region VR1, the intermediate visual field region VR2, and the peripheral visual field region VR3 of the user, respectively. The central visual field region VR1, the intermediate visual field region VR2, and the peripheral visual field region VR3 may vary for each user. Accordingly, in general, the foveal region R1, the blend region R2, and the peripheral region R3 of the output image data IMD2 may not match the central image IMG1, the intermediate image IMG2, and the peripheral image IMG3, respectively. However, for convenience of description, the central image IMG1, the intermediate image IMG2, and the peripheral image IMG3 will be described below as matching the foveal region R1, the blend region R2, and the peripheral region R3 of the output image data IMD2, respectively.

The spatial frequency calculator 152 may calculate a first spatial frequency CPD1 of the central image IMG1, a second spatial frequency CPD2 of the intermediate image IMG2, and a third spatial frequency CPD3 of the peripheral image IMG3. The spatial frequency may refer to the number of cycles of data included within a 1-degree visual field, and may be referred to as cycles per degree (CPD).

According to one or more embodiments, the first spatial frequency CPD1, the second spatial frequency CPD2, and the third spatial frequency CPD3 may be calculated by performing fast Fourier transform (FFT) on the central image IMG1, the intermediate image IMG2, and the peripheral image IMG3, respectively. As shown in FIG. 7, the fast Fourier transform may be performed on the central image IMG1, the intermediate image IMG2, and the peripheral image IMG3 to obtain first Fourier data FFT1, second Fourier data FFT2, and third Fourier data FFT3 corresponding to the central image IMG1, the intermediate image IMG2, and the peripheral image IMG3, respectively. The first Fourier data FFT1, the second Fourier data FFT2, and the third Fourier data FFT3 may be analyzed to calculate the first spatial frequency CPD1, the second spatial frequency CPD2, and the third spatial frequency CPD3.

A spatial frequency of an image may be gradually decreased as a resolution of the image decreases. Because the resolution decreases in a direction from the foveal region R1 to the blend region R2, and then to the peripheral region R3, a resolution of the intermediate image IMG2 may be lower than a resolution of the central image IMG1, and a resolution of the peripheral image IMG3 may be lower than the resolution of the intermediate image IMG2. Accordingly, the second spatial frequency CPD2 may be less than the first spatial frequency CPD1, and the third spatial frequency CPD3 may be less than the second spatial frequency CPD2.

The critical flicker frequency calculator 153 may calculate a first critical flicker frequency CFF1 of the central visual field region VR1, a second critical flicker frequency CFF2 of the intermediate visual field region VR2, and a third critical flicker frequency CFF3 of the peripheral visual field region VR3 based on the first to third spatial frequencies CPD1, CPD2, and CPD3 and the viewing angles of the central visual field region VR1, the intermediate visual field region VR2, and the peripheral visual field region VR3. A critical flicker frequency (CFF) may refer to a minimum frequency at which a user may not recognize a flicker. In other words, when a driving frequency of a visual field region is greater than or equal to a critical flicker frequency of the visual field region, a user may not recognize a flicker in the visual field region.

FIG. 8 shows a critical flicker frequency CFF[0.1] according to a viewing angle when a spatial frequency CPD is 0.1, a critical flicker frequency CFF[1.2] according to the viewing angle when the spatial frequency CPD is 1.2, and a critical flicker frequency CFF[2.0] according to the viewing angle when the spatial frequency CPD is 2.0.

Referring to FIG. 8, a critical flicker frequency CFF may vary according to a spatial frequency CPD and a viewing angle. Even when the spatial frequency CPD is the same, the critical flicker frequency CFF may vary when the viewing angle varies, and even when the viewing angle is the same, the critical flicker frequency CFF may vary when the spatial frequency CPD varies. According to one or more embodiments, a viewing angle of the central visual field region VR1 may be about 0 degrees to about 15 degrees, a viewing angle of the intermediate visual field region VR2 may be about 15 degrees to about 45 degrees, and a viewing angle of the peripheral visual field region VR3 may be about 45 degrees or more. In this case, when the spatial frequency CPD is 0.1, the second critical flicker frequency CFF2 may be greater than the first critical flicker frequency CFF1, and the third critical flicker frequency CFF3 may be less than the second critical flicker frequency CFF2.

FIG. 9 is a graph showing a temporal contrast sensitivity function (TCSF) of each of a central visual field region VR1, an intermediate visual field region VR2, and a peripheral visual field region VR3.

Referring to FIG. 9, according to one or more embodiments, the first to third critical flicker frequencies CFF1, CFF2, and CFF3 may be calculated by using a temporal contrast sensitivity function. The temporal contrast sensitivity function may represent a sensitivity for a flicker in a visual field region with respect to a frequency of the visual field region. In the temporal contrast sensitivity function, a minimum frequency at which a sensitivity becomes about 0 may be the critical flicker frequency. Accordingly, the minimum frequency at which the sensitivity becomes about 0 in the temporal contrast sensitivity function in the central visual field region VR1 may be calculated as the first critical flicker frequency CFF1, the minimum frequency at which the sensitivity becomes about 0 in the temporal contrast sensitivity function in the intermediate visual field region VR2 may be calculated as the second critical flicker frequency CFF2, and the minimum frequency at which the sensitivity becomes about 0 in the temporal contrast sensitivity function in the peripheral visual field region VR3 may be calculated as the third critical flicker frequency CFF3.

The driving frequency determiner 154 may determine the first driving frequency DF1 of the central visual field region VR1, the second driving frequency DF2 of the intermediate visual field region VR2, and the third driving frequency DF3 of the peripheral visual field region VR3 based on the first to third critical flicker frequencies CFF1, CFF2, and CFF3.

According to one or more embodiments, the first driving frequency DF1, the second driving frequency DF2, and the third driving frequency DF3 may be greater than or equal to the first critical flicker frequency CFF1, the second critical flicker frequency CFF2, and the third critical flicker frequency CFF3, respectively. Because the driving frequency is greater than or equal to the critical flicker frequency in each of the central visual field region VR1, the intermediate visual field region VR2, and the peripheral visual field region VR3, a flicker may not be visually recognized in the central visual field region VR1, the intermediate visual field region VR2, or the peripheral visual field region VR3.

Figure 10:
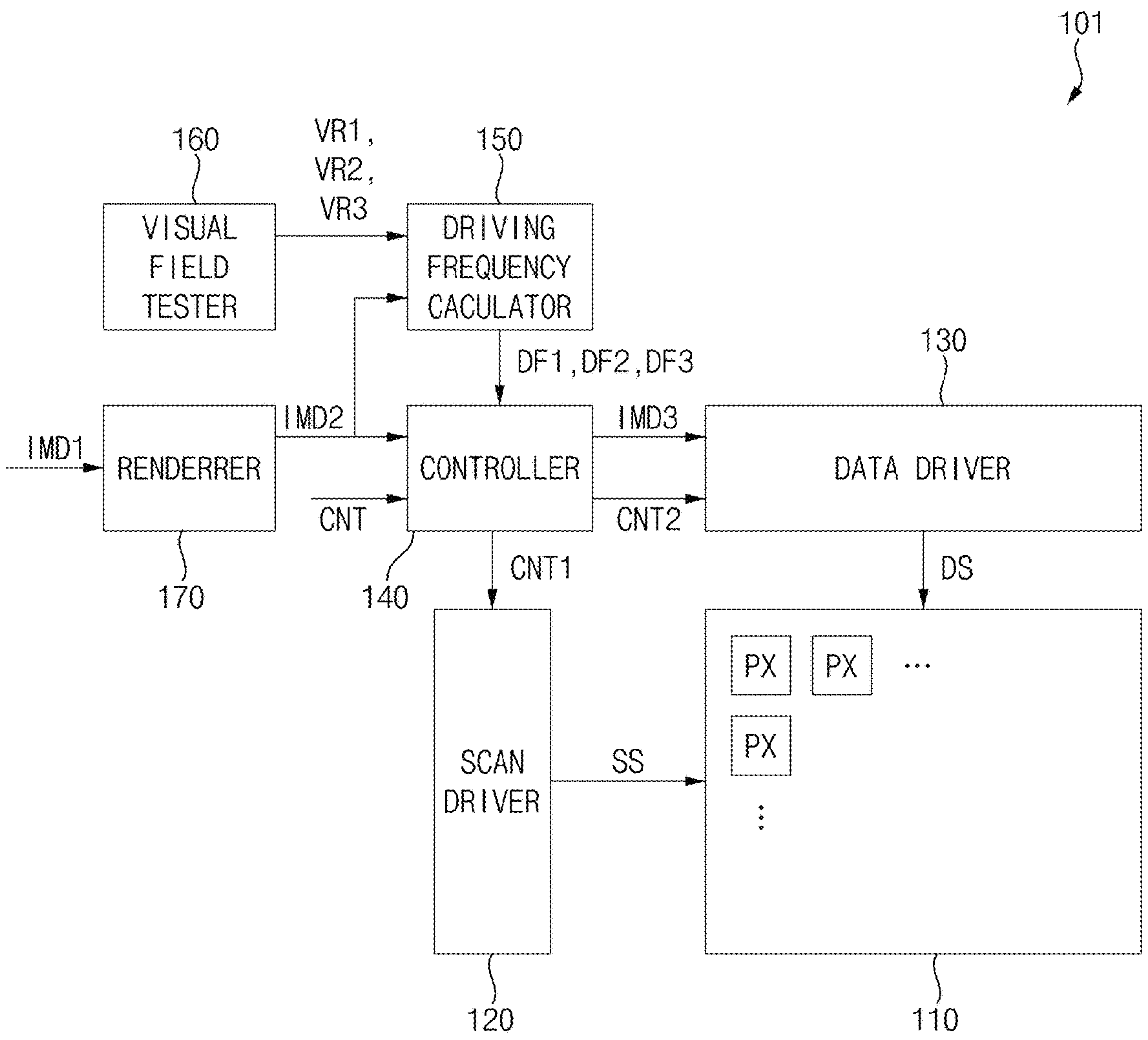
FIG. 10 is a block diagram showing a display device according to one or more embodiments of the present disclosure.

FIG. 10 is a block diagram showing a display device 101 according to one or more embodiments of the present disclosure.

Referring to FIG. 10, a display device 101 may include a display panel 110, a scan driver 120, a data driver 130, a controller 140, a driving frequency calculator 150, a visual field tester 160, and a renderer 170. The display device 101 that will be described with reference to FIG. 10 may be substantially identical or similar to the display device 100 described with reference to FIG. 1 except that the display device 101 further includes the renderer 170. Accordingly, redundant descriptions of components will be omitted.

The renderer 170 may convert input image data IMD1 into output image data IMD2 by performing foveated rendering on the input image data IMD1. The renderer 170 may convert externally provided input image data IMD1 into the output image data IMD2, and may provide the output image data IMD2 to the controller 140 and the driving frequency calculator 150.

Figure 11:
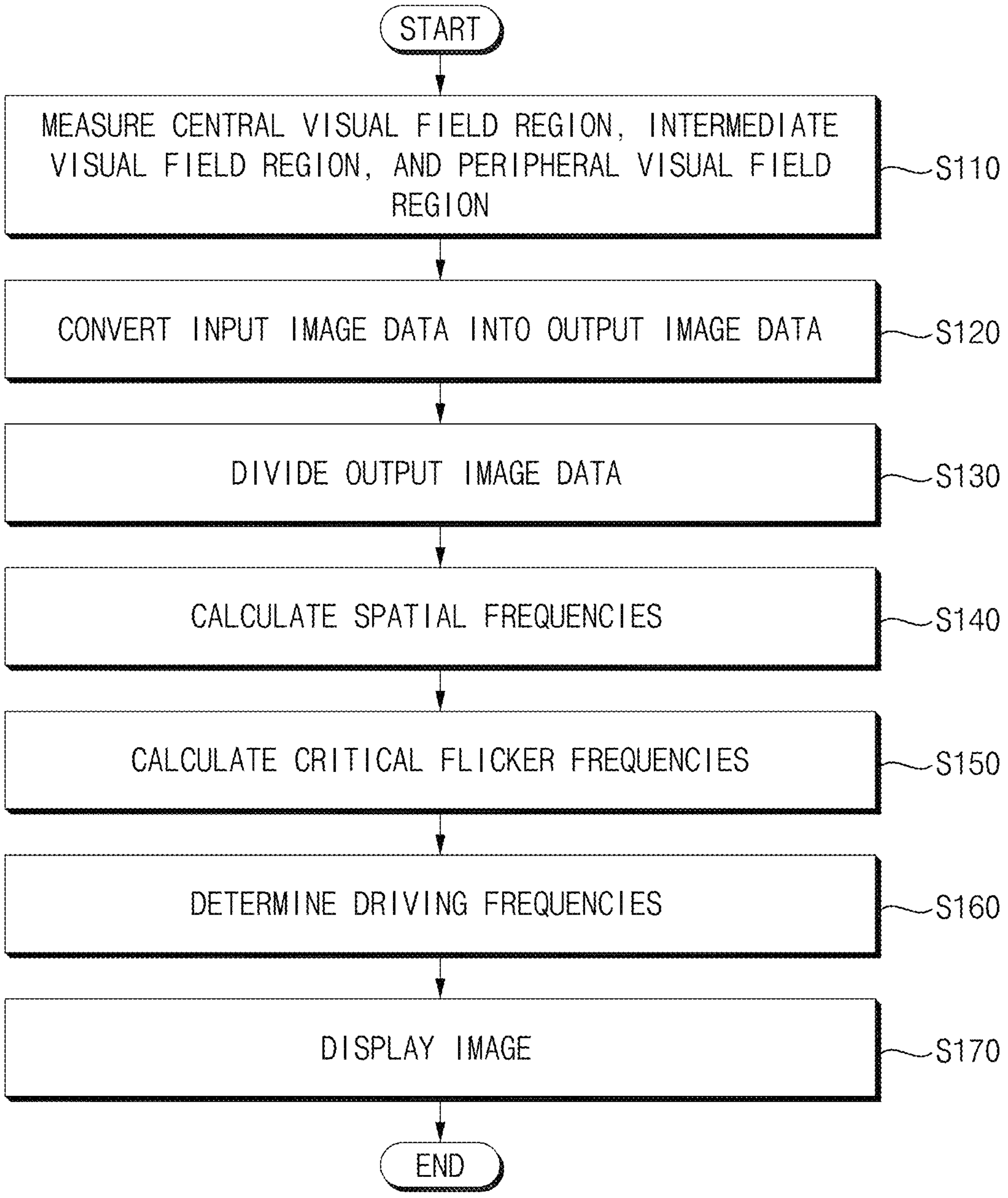
FIG. 11 is a flowchart showing a method for driving a display device according to one or more embodiments of the present disclosure.

FIG. 11 is a flowchart showing a method for driving a display device according to one or more embodiments of the present disclosure.

Referring to FIGS. 1 and 11, according to a method for driving a display device 100, a visual field tester 160 may measure a central visual field region VR1, an intermediate visual field region VR2, and a peripheral visual field region VR3 through a visual field test for a user (S110). As shown in FIG. 3, the visual field tester 160 may set a region including a gaze point GP of the user as the central visual field region VR1, may set a region surrounding the central visual field region VR1 as the intermediate visual field region VR2, and may set a region excluding the central visual field region VR1 and the intermediate visual field region VR2 (e.g., among an entire visual field region VR of the user) as the peripheral visual field region VR3.

Referring to FIGS. 10 and 11, a renderer 170 may convert input image data IMD1 into output image data IMD2 by performing foveated rendering on the input image data IMD1 (S120). When the display device 100 receives externally provided output image data IMD2, the operation S120 of converting the input image data IMD1 into the output image data IMD2 may be omitted.

Referring to FIGS. 5 and 11, an image divider 151 of a driving frequency calculator 150 may divide the output image data IMD2 into a central image IMG1, an intermediate image IMG2, and a peripheral image IMG3 (S130). As shown in FIG. 6, the central image IMG1, the intermediate image IMG2, and the peripheral image IMG3 may correspond to the central visual field region VR1, the intermediate visual field region VR2, and the peripheral visual field region VR3 of the user, respectively.

A spatial frequency calculator 152 of the driving frequency calculator 150 may calculate a first spatial frequency CPD1 of the central image IMG1, a second spatial frequency CPD2 of the intermediate image IMG2, and a third spatial frequency CPD3 of the peripheral image IMG3 (S140).

According to one or more embodiments, the first spatial frequency CPD1, the second spatial frequency CPD2, and the third spatial frequency CPD3 may be calculated by performing fast Fourier transform (FFT) on the central image IMG1, the intermediate image IMG2, and the peripheral image IMG3, respectively. As shown in FIG. 7, the fast Fourier transform may be performed on the central image IMG1, the intermediate image IMG2, and the peripheral image IMG3 to obtain first Fourier data FFT1, second Fourier data FFT2, and third Fourier data FFT3 corresponding to the central image IMG1, the intermediate image IMG2, and the peripheral image IMG3, respectively. The first Fourier data FFT1, the second Fourier data FFT2, and the third Fourier data FFT3 may be analyzed to calculate the first spatial frequency CPD1, the second spatial frequency CPD2, and the third spatial frequency CPD3. According to one or more embodiments, the second spatial frequency CPD2 may be less than the first spatial frequency CPD1, and the third spatial frequency CPD3 may be less than the second spatial frequency CPD2.

A critical flicker frequency calculator 153 of the driving frequency calculator 150 may calculate a first critical flicker frequency CFF1 of the central visual field region VR1, a second critical flicker frequency CFF2 of the intermediate visual field region VR2, and a third critical flicker frequency CFF3 of the peripheral visual field region VR3 based on the first to third spatial frequencies CPD1, CPD2, and CPD3, and based on viewing angles of the central visual field region VR1, the intermediate visual field region VR2, and the peripheral visual field region VR3 (S150).

According to one or more embodiments, the first to third critical flicker frequencies CFF1, CFF2, and CFF3 may be calculated by using a temporal contrast sensitivity function. As shown in FIG. 9, a minimum frequency at which a sensitivity becomes 0 in the temporal contrast sensitivity function in the central visual field region VR1 may be calculated as the first critical flicker frequency CFF1, the minimum frequency at which the sensitivity becomes 0 in the temporal contrast sensitivity function in the intermediate visual field region VR2 may be calculated as the second critical flicker frequency CFF2, and the minimum frequency at which the sensitivity becomes 0 in the temporal contrast sensitivity function in the peripheral visual field region VR3 may be calculated as the third critical flicker frequency CFF3.

A driving frequency determiner 154 of the driving frequency calculator 150 may determine a first driving frequency DF1 of the central visual field region VR1, a second driving frequency DF2 of the intermediate visual field region VR2, and a third driving frequency DF3 of the peripheral visual field region VR3 based on the first to third critical flicker frequencies CFF1, CFF2, and CFF3 (S160).

According to one or more embodiments, the first driving frequency DF1, the second driving frequency DF2, and the third driving frequency DF3 may be greater than or equal to the first critical flicker frequency CFF1, the second critical flicker frequency CFF2, and the third critical flicker frequency CFF3, respectively.

Referring to FIGS. 1 and 11, a display panel 110 may display an image based on the output image data IMD2 and the first to third driving frequencies DF1, DF2, and DF3 (S170). Because the driving frequency is greater than or equal to the critical flicker frequency in each of the central visual field region VR1, the intermediate visual field region VR2, and the peripheral visual field region VR3, a flicker may not be visually recognized in the central visual field region VR1, the intermediate visual field region VR2, or the peripheral visual field region VR3, and image quality of the display device 100 may be improved. In addition, because the first to third driving frequencies DF1, DF2, and DF3 are determined independently of each other, power consumption of the display device 100 may be reduced.

Figure 12:
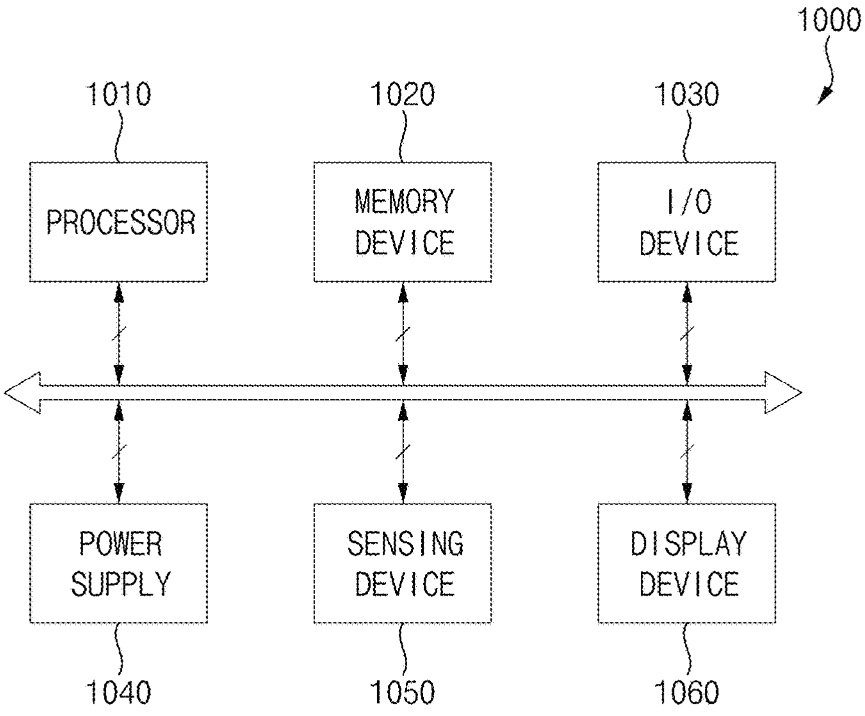
FIG. 12 is a block diagram showing a head-mounted display apparatus according to one or more embodiments of the present disclosure.

FIG. 12 is a block diagram showing a head-mounted display apparatus 1000 according to one or more embodiments of the present disclosure.

Referring to FIG. 12, a head-mounted display (HMD) apparatus 1000 may include a processor 1010, a memory device 1020, an input/output (I/O) device 1030, a power supply 1040, a sensing device 1050, and a display device 1060. The components of the head-mounted display apparatus 1000 are not limited to the components shown in FIG. 12, and the head-mounted display apparatus 1000 may have more or fewer components than the components shown in FIG. 12.

The processor 1010 may perform specific calculations or tasks. The processor 1010 may control an overall operation of the head-mounted display apparatus 1000. According to one or more embodiments, the processor 1010 may be a microprocessor, a central processing unit (CPU), or the like. The processor 1010 may be connected to other components through an address bus, a control bus, a data bus, and/or the like. According to one or more embodiments, the processor 1010 may also be connected to an expansion bus such as a peripheral component interconnect (PCI) bus.

The processor 1010 may convert input image data into output image data (e.g., IMD2 of FIG. 1). According to one or more embodiments, the processor 1010 may generate the output image data IMD2 by performing foveated rendering on the input image data.

The memory device 1020 may store data suitable for an operation of the head-mounted display apparatus 1000. For example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The I/O device 1030 may include: an input device including a camera or an image inputter configured to input an image signal, a microphone or an audio inputter configured to input an audio signal, a user inputter (e.g., a touch key, a push key, a joystick, a wheel, etc.) configured to receive information from a user, and/or the like; and an output device including an audio outputter, a haptic module, an optical outputter, and/or the like configured to generate an output associated with visual sensation, auditory sensation, tactile sensation or the like.

The power supply 1040 may supply a power suitable for the operation of the head-mounted display apparatus 1000. The power supply 1040 may receive an external power and an internal power, and may supply the power to each of the components included in the head-mounted display apparatus 1000. The power supply 1040 may be implemented as a built-in battery or a replaceable battery.

The sensing device 1050 may include at least one sensor configured to sense information on a peripheral environment of the head-mounted display apparatus 1000, information on a user of the head-mounted display apparatus 1000, and/or the like. For example, the sensing device 1050 may include a speed sensor, an acceleration sensor, a gravity sensor, an illumination sensor, a motion sensor, a fingerprint recognition sensor, an optical sensor, an ultrasonic sensor, a heat sensor, and/or the like.

The display device 1060 may be connected to other components through the buses or other communication links. The display device 1060 may display information processed by the head-mounted display apparatus 1000. The display device 1060 may correspond to the display device 100 of FIG. 1 or the display device 101 of FIG. 10.

Figure 13:
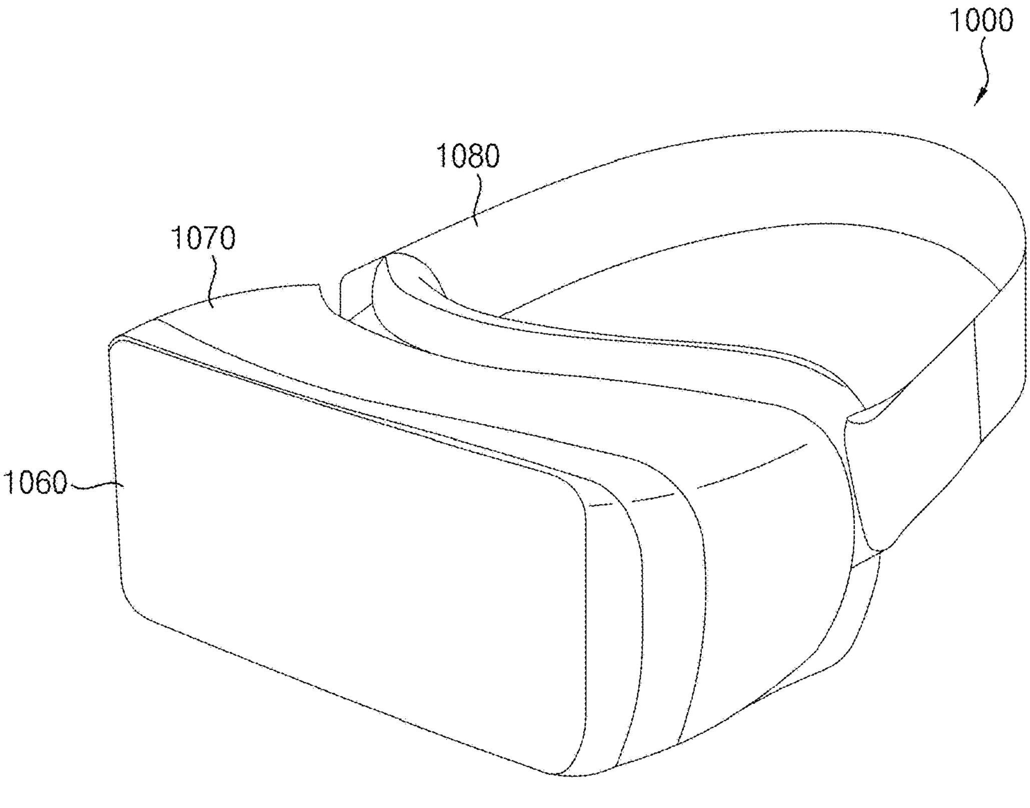
FIG. 13 is a view showing an example in which the head-mounted display apparatus of FIG. 12 is implemented.

FIG. 13 is a view showing an example in which the head-mounted display apparatus 1000 of FIG. 12 is implemented.

Referring to FIG. 13, the head-mounted display apparatus 1000 may include a display device 1060, a housing 1070, and a mounting part 1080. The head-mounted display apparatus 1000 may be mounted on a head of a user to provide image information to the user. The display device 1060 may display an image based on the image data. The display device 1060 may provide the image to each of left and right eyes of the user. A left eye image corresponding to the left eye of the user and a right eye image corresponding to the right eye of the user may be identical to or different from each other. The head-mounted display apparatus 1000 may provide a two-dimensional image, a three-dimensional image, virtual reality (VR), a 360-degree panoramic images, or the like through the display device 1060.

The display device 1060 may be a liquid crystal display device, an organic light emitting display device, an inorganic light emitting display device, a quantum dot light emitting display device, or the like. The display device 1060 may be mounted in the housing 1070, or may be coupled to the housing 1070. The display device 1060 may receive an instruction through an interface unit or the like provided in the housing 1070.

The housing 1070 may be located on a front side of the eyes of the user. The housing 1070 may store the components configured to operate the head-mounted display apparatus 1000. In addition, a wireless communication unit, the interface unit, and/or the like may be located in the housing 1070. The wireless communication unit may perform wireless communication with an external terminal to receive an image signal from the external terminal. For example, the wireless communication unit may communicate with the external terminal by using Bluetooth, radio frequency identification (RFID), infrared data association (IrDA), ZigBee, near field communication (NFC), wireless-fidelity (Wi-Fi), ultra-wideband (UWB), or the like. The interface unit may connect the head-mounted display apparatus 1000 to an external apparatus. For example, the interface unit may include at least one of a wired/wireless headset port, an external charger port, a wired/wireless data port, a memory card port, a port configured to connect a device provided with an identification module, an audio I/O port, a video I/O port, or an earphone port.

The mounting part 1080 may be connected to the housing 1070 to fix the head-mounted display apparatus 1000 to the head of the user. For example, the mounting part 1080 may be implemented as a belt, a band having elasticity, or the like.

The display device according to the embodiments may be applied to a display device included in a head-mounted display (HMD), a computer, a notebook, a mobile phone, a smart phone, a smart pad, a PMP, a PDA, an MP3 player, or the like.

Although the display devices, the methods for driving the display devices, and the head-mounted display apparatuses according to the embodiments have been described with reference to the drawings, the illustrated embodiments are examples, and may be modified and changed by a person having ordinary knowledge in the relevant technical field without departing from the technical spirit described in the following claims, with functional equivalents thereof to be included therein.

What is claimed is:

1. A display device comprising:

a driving frequency calculator configured to:

divide output image data into a central image, an intermediate image, and a peripheral image respectively corresponding to a central visual field region, an intermediate visual field region, and a peripheral visual field region;

calculate spatial frequencies of the central image, the intermediate image, and the peripheral image;

calculate critical flicker frequencies of the central visual field region, the intermediate visual field region, and the peripheral visual field region based on the spatial frequencies and based on viewing angles of the central visual field region, the intermediate visual field region, and the peripheral visual field region; and determine driving frequencies of the central visual field region, the intermediate visual field region, and the peripheral visual field region based on the critical flicker frequencies; and a display panel configured to display an image based on the output image data and based on the driving frequencies.

2. The display device of claim 1, wherein the output image data comprises input image data on which foveated rendering is performed.

3. The display device of claim 1, further comprising a visual field tester configured to measure the central visual field region, the intermediate visual field region, and the peripheral visual field region through a visual field test.

4. The display device of claim 3, wherein the visual field tester is configured to:

set a region comprising a gaze point as the central visual field region;

set a region surrounding the central visual field region as the intermediate visual field region; and set a region excluding the central visual field region and the intermediate visual field region, among an entire visual field region, as the peripheral visual field region.

5. The display device of claim 1, wherein the spatial frequencies are calculated by performing fast Fourier transform (FFT) on the central image, the intermediate image, and the peripheral image.

6. The display device of claim 1, wherein a spatial frequency of the peripheral image is less than a spatial frequency of the central image.

7. The display device of claim 1, wherein the critical flicker frequencies are calculated by using a temporal contrast sensitivity function.

8. The display device of claim 1, wherein the driving frequencies of the central visual field region, the intermediate visual field region, and the peripheral visual field region are greater than or equal to the critical flicker frequencies of the central visual field region, the intermediate visual field region, and the peripheral visual field region, respectively.

9. The display device of claim 1, further comprising a renderer configured to convert input image data into the output image data by performing foveated rendering on the input image data.

10. A method for driving a display device, the method comprising:

dividing output image data into a central image, an intermediate image, and a peripheral image respectively corresponding to a central visual field region, an intermediate visual field region, and a peripheral visual field region;

calculating spatial frequencies of the central image, the intermediate image, and the peripheral image;

calculating critical flicker frequencies of the central visual field region, the intermediate visual field region, and the peripheral visual field region based on the spatial frequencies and based on viewing angles of the central visual field region, the intermediate visual field region, and the peripheral visual field region;

determining driving frequencies of the central visual field region, the intermediate visual field region, and the peripheral visual field region based on the critical flicker frequencies; and displaying an image based on the output image data and based on the driving frequencies.

11. The method of claim 10, further comprising generating the output image data by performing foveated rendering on input image data.

12. The method of claim 10, further comprising measuring the central visual field region, the intermediate visual field region, and the peripheral visual field region through a visual field test.

13. The method of claim 10, further comprising:

setting a region comprising a gaze point as the central visual field region;

setting a region surrounding the central visual field region as the intermediate visual field region; and setting a region excluding the central visual field region and the intermediate visual field region, among an entire visual field region, as the peripheral visual field region.

14. The method of claim 10, wherein the spatial frequencies are calculated by performing fast Fourier transform (FFT) on the central image, the intermediate image, and the peripheral image.

15. The method of claim 10, wherein a spatial frequency of the peripheral image is less than a spatial frequency of the central image.

16. The method of claim 10, wherein the critical flicker frequencies are calculated by using a temporal contrast sensitivity function.

17. The method of claim 10, wherein the driving frequencies of the central visual field region, the intermediate visual field region, and the peripheral visual field region are greater than or equal to the critical flicker frequencies of the central visual field region, the intermediate visual field region, and the peripheral visual field region, respectively.

18. The method of claim 10, further comprising converting input image data into the output image data by performing foveated rendering on the input image data.

19. A head-mounted display apparatus comprising:

a processor configured to convert input image data into output image data; and a display device configured to display an image based on the output image data, and comprising:

a driving frequency calculator configured to:

divide the output image data into a central image, an intermediate image, and a peripheral image respectively corresponding to a central visual field region, an intermediate visual field region, and a peripheral visual field region;

calculate spatial frequencies of the central image, the intermediate image, and the peripheral image;

calculate critical flicker frequencies of the central visual field region, the intermediate visual field region, and the peripheral visual field region based on the spatial frequencies and based on viewing angles of the central visual field region, the intermediate visual field region, and the peripheral visual field region; and determine driving frequencies of the central visual field region, the intermediate visual field region, and the peripheral visual field region based on the critical flicker frequencies; and a display panel configured to display the image based on the output image data and based on the driving frequencies.

20. The head-mounted display apparatus of claim 19, wherein the processor is configured to generate the output image data by performing foveated rendering on the input image data.

* * * * *